United States Patent [19]
Takizawa

[11] Patent Number: 5,876,871
[45] Date of Patent: Mar. 2, 1999

[54] NICKEL-HYDROGEN BATTERY CELL, AND NICKEL-HYDROGEN BATTERY COMPRISING A PLURALITY OF NICKEL-HYDROGEN BATTERY CELLS

[75] Inventor: Yoshihiro Takizawa, Tokyo, Japan

[73] Assignee: Kabushiki Kaisha Toshiba, Kawasaki, Japan

[21] Appl. No.: 713,179

[22] Filed: Sep. 12, 1996

[51] Int. Cl.⁶ .......................... H01M 4/36; H01M 12/06
[52] U.S. Cl. ........................ 429/101; 429/120; 429/223
[58] Field of Search ................................ 429/101, 223, 429/120

[56] References Cited

U.S. PATENT DOCUMENTS 4,189,527  2/1980  Stadnick et al. .................... 429/101 X
5,215,835  6/1993  Jones ...................................... 429/101

*Primary Examiner*—John S. Maples
*Attorney, Agent, or Firm*—Oblon, Spivak, McClelland, Maier & Neustadt, P.C.

[57] ABSTRACT

A nickel-hydrogen battery cell is provided with a pressure vessel made up of upper and lower vessel elements. The lower vessel element has a flange section on the outer wall thereof. A coil heater is attached to the flange section. The temperature of the pressure vessel is controlled by heating the flange section by means of the coil heater. The pressure vessel is assembled with reference to a fixing plate by coupling the flange section to the surface of the fixing plate.

20 Claims, 4 Drawing Sheets

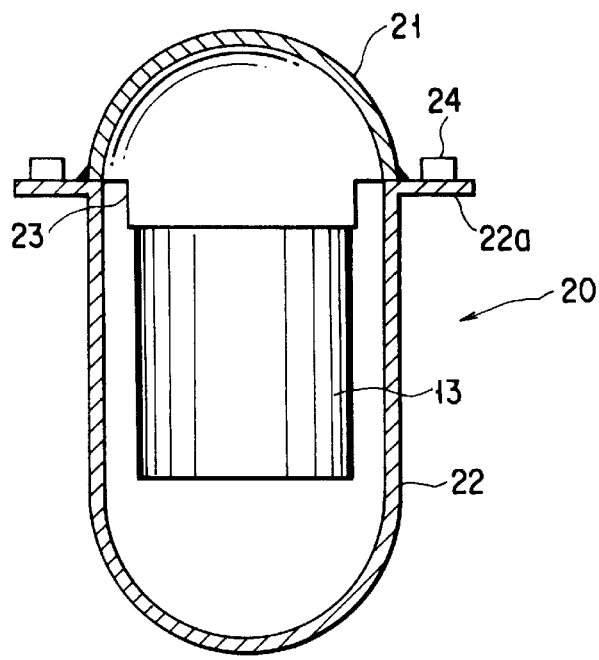
FIG. 1
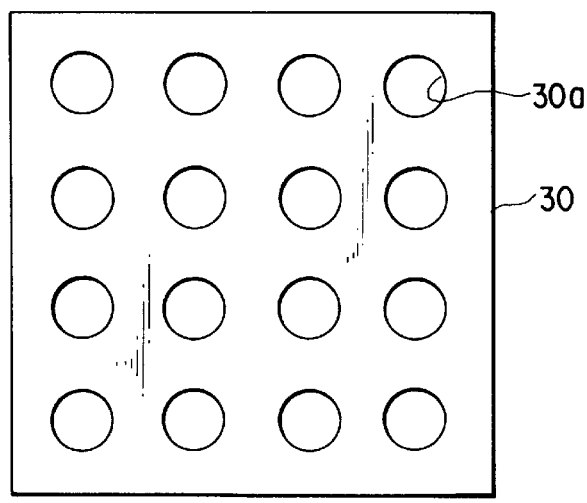
FIG. 2
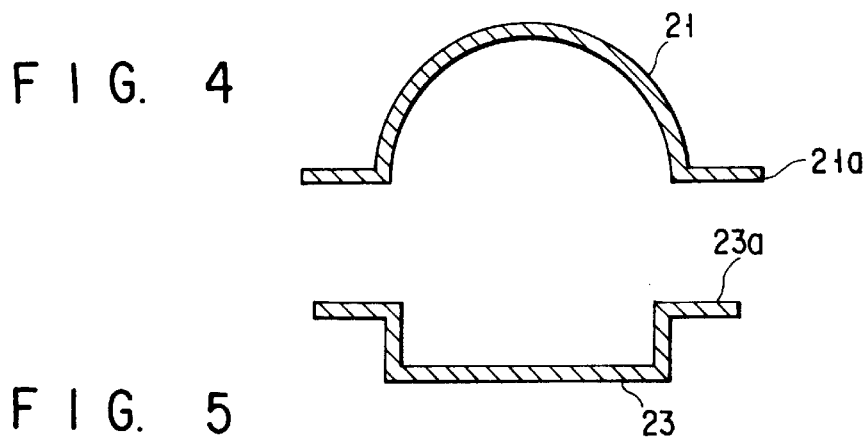
FIG. 4
FIG. 5

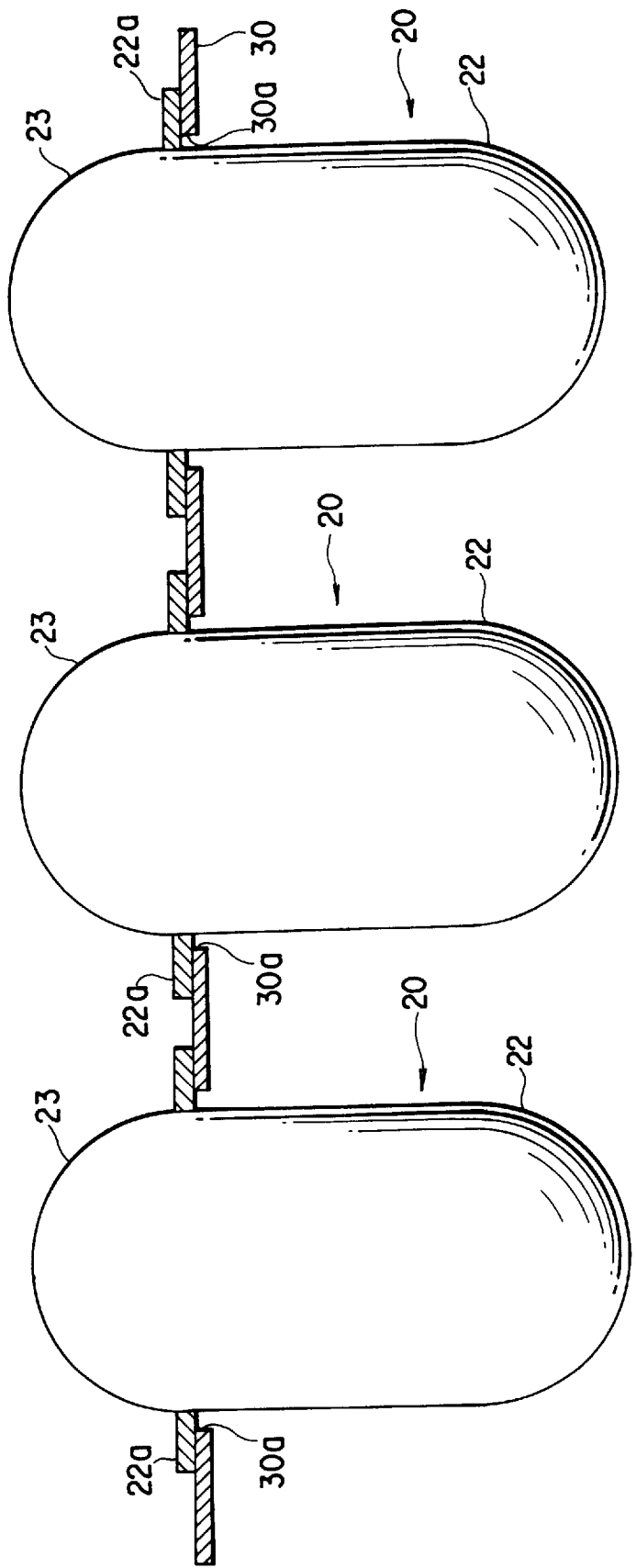

NICKEL-HYDROGEN BATTERY CELL, AND NICKEL-HYDROGEN BATTERY COMPRISING A PLURALITY OF NICKEL-HYDROGEN BATTERY CELLS

BACKGROUND OF THE INVENTION

1. Field of the Invention

The present invention relates to a nickel-hydrogen battery cell which is employed in a space traveling object, such as an artificial satellite, and used as a power source.

2. Description of the Related Art

As is well known, a nickel-hydrogen battery is made up of a number of nickel-hydrogen battery cells. In each nickel-hydrogen battery cell, a nickel (Ni) electrode, which utilizes the technology of a nickel-cadmium battery, is used as a positive electrode, and a hydrogen ($H_2$) electrode (catalytic electrode), which utilizes the technology of a known oxygen-hydrogen fuel cell, is used as a negative electrode. These electrodes are arranged in combination, and the chemical action between the hydrogen and nickel electrodes is utilized to generate desired electric energy.

The nickel-hydrogen battery cell will be described in more detail with reference to FIG. 6. As is shown, a nickel electrode 10 and a hydrogen electrode 11 are arranged such that a separator 12 impregnated with an electrolytic solution (an alkali solution) which permits movement of $OH^-$ ions is interposed therebetween. A number of electrode pairs, each electrode pair having this structure, are combined together to form a power generating element 13. This power generating element 13 is sealed inside a pressure vessel 14 formed of a metallic material, such as inconel 71. The nickel electrodes 10 of the power generating element 13 are connected to a positive terminal 15, and the hydrogen electrodes 11 are connected to an negative terminal 16 by way of harness 17. Owing to the chemical action between the nickel and hydrogen electrodes 10 and 11, the power generating element 13 generates electric energy. When the power generating element 13 is overcharged, an oxygen gas is generated from its nickel electrodes 10, due to the following chemical reaction:

$$2OH^- \rightarrow \tfrac{1}{2} O_2 + H_2O + 2e^-$$

This oxygen gas combines with the hydrogen gas irreversibly generated from the hydrogen electrodes in the presence of catalyst, thereby forming water, as follows:

$$H_2 + \tfrac{1}{2} O_2 \rightarrow H_2O$$

In this type of nickel-hydrogen battery cell, an electrochemical reaction which converts the hydrogen gas generated at the time of charging into electric energy at the time of discharging, is made to take place so as to generate desired electric energy. Since such an electrochemical reaction is utilized, the nickel-hydrogen battery cell will deteriorate in characteristics if the ambient temperature is low.

To solve this problem, the measures shown in FIG. 7 are taken. As shown, a sleeve member 19, formed of an aluminum alloy, is coupled to the outer periphery of the pressure vessel 14 by use of a silicone-based adhesive improved in thermal conductivity, in such a manner that the sleeve member 19 surrounds the pressure vessel 14. A sheet heaters 1 are adhered to the outer periphery of the sleeve member 19, for temperature control. When the sheet heaters are selectively driven, the heat generated thereby is transmitted to the pressure vessel through the respective sleeve members 19, thereby controlling the pressure vessel 14 at a temperature suitable for electrochemical reaction.

In the nickel-hydrogen battery cell mentioned above, however, the sleeve member 19 is heated by the sheet heaters 1, and the temperature of the pressure vessel 14 is controlled with the heat transmitted through the sleeve member 19. Due to this structure, the battery cell is poor in heat control characteristics, and the sheet heaters must be large in capacity.

In addition, the operation of adhering a sheet heater 1 to a sleeve member 19 and coupling this sleeve member 19 to a fixing plate 18 has to be performed for each of the nickel-hydrogen battery cells. Therefore, the assembling operation involved in the manufacture of the nickel-hydrogen battery is very complicated.

These are very serious problems in the field of space development since saving power is particularly important in the field.

SUMMARY OF THE INVENTION

Accordingly, an object of the present invention is to provide a nickel-hydrogen battery cell which is simple in structure and is improved in both thermal control characteristic and power saving characteristic.

This object is attained by a nickel-hydrogen battery cell comprising:

a pressure vessel having an outer wall from which a flange is projected; and a power generating element sealed inside the pressure vessel and including a plurality of pairs of electrodes, each of the pairs having a nickel electrode, a hydrogen electrode, and a separator interposed between the nickel and hydrogen electrodes and impregnated with an electrolytic solution, the power generating element generating power by utilization of a chemical reaction between the nickel electrode and the hydrogen electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a sectional view of a nickel-hydrogen battery cell according to one embodiment of the present invention;

FIG. 2 is a plan view of a fixing plate with reference to which the nickel-hydrogen battery cell depicted in FIG. 1 is assembled;

FIG. 3 is a partially-sectional view of a major portion of a nickel-hydrogen battery, which is obtained by assembling nickel-hydrogen battery cells, each having the structure shown in FIG. 1, with reference to the fixing plate shown in FIG. 2;

FIG. 4 is a sectional view of a major portion of one modification of the above embodiment;

FIG. 5 is a sectional view of a major portion of another modification;

DETAILED DESCRIPTION OF THE PREFERRED EMBODIMENTS

Figure 6:
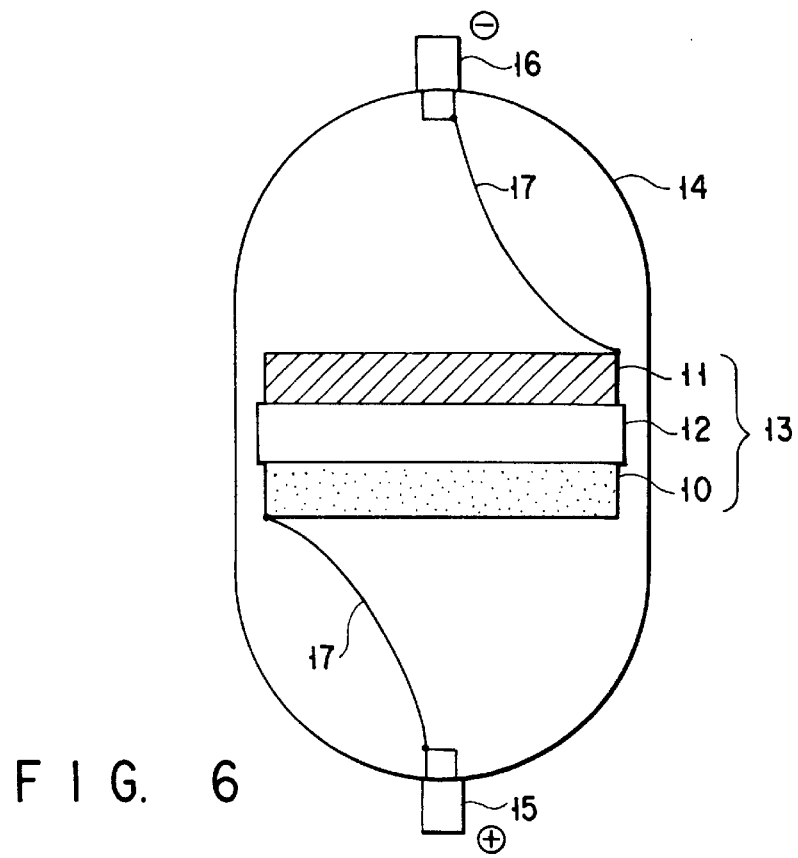
FIG. 6 is a conceptual view showing the structure and technical concept underlying a nickel-hydrogen battery cell to which the present invention is applied.
Figure 7:
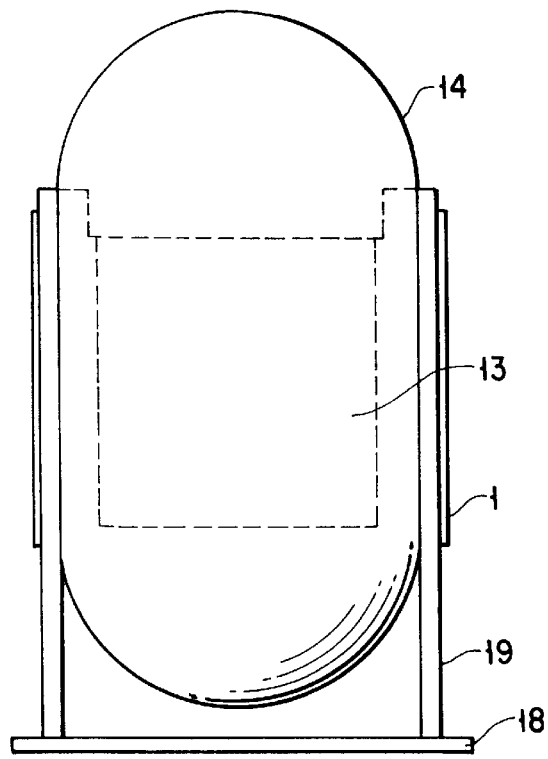
FIG. 7 is a side view of an ordinary nickel-hydrogen battery cell and is intended to explain the entailed problems.
Figure 8:
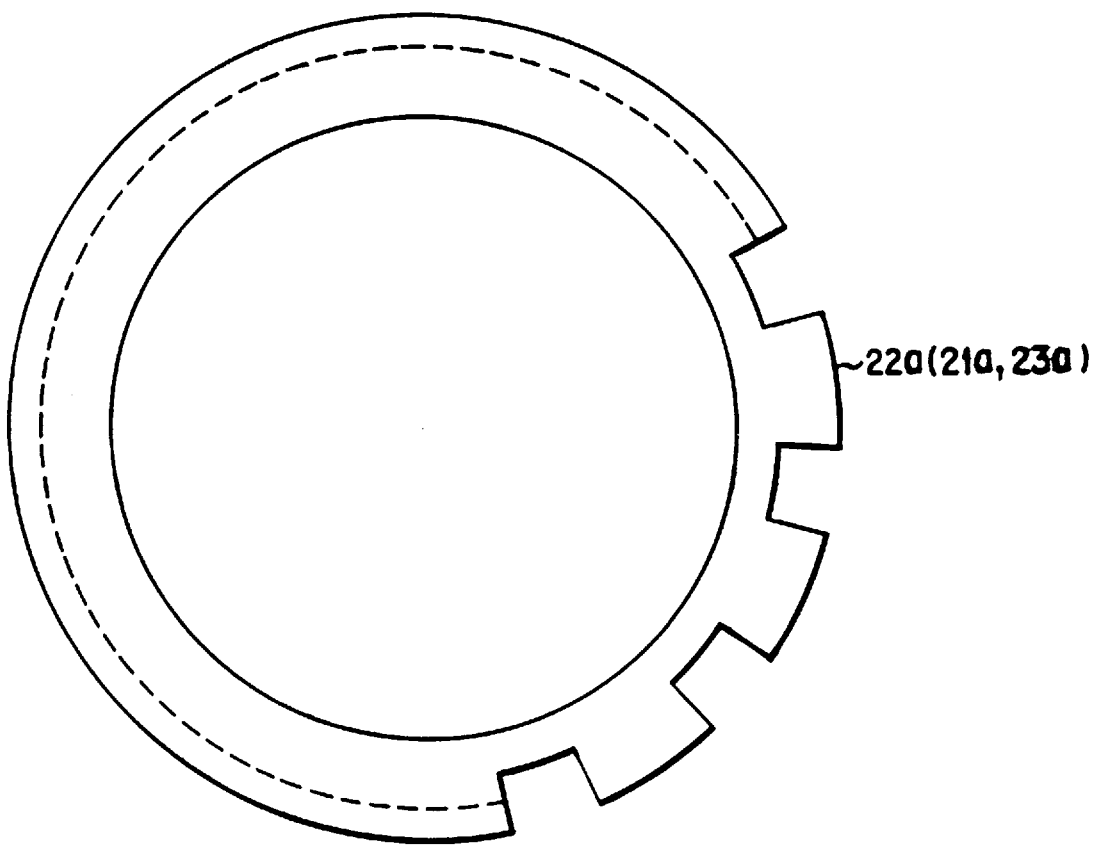
FIG. 8 is a plan view of the flange section of the lower vessel element including cutout sections.

A detailed description will be given as to how the present invention is embodied, with reference to the accompanying drawings. FIG. 1 shows a nickel-hydrogen battery cell according to one embodiment of the present invention. The battery cell comprises a pressure vessel 20 formed of a metallic material, such as inconel 718. The pressure vessel 20 is made up of upper and lower vessel elements 21 and 22. These vessel elements 21 and 22 are welded together with a welding ring 23 interposed, in such a manner as to form a capsule-like structure.

The lower vessel element 22 has a flange section 22a which is located at the open end thereof and protrudes outward. The flange section 22a is formed of a material improved in thermal conductivity, such as copper. The open end of the upper vessel element 21 is welded to the proximal end of the flange section 22a, with the welding ring 23 interposed. Accordingly, the flange section 22a of the lower vessel element 22 protrudes from the connection between the upper and lower vessel elements 21 and 22. A coil heater 24 for temperature control is attached to one side of the flange section 22a by means of a screw, for example.

Each of the upper and lower vessel elements 21 and 22 of the pressure vessel 20 is formed to have a semi-spherical shape by drawing. Although not shown, positive and negative terminals from which power is applied to an external device are provided for the upper and lower vessel elements 21 and 22. The positive and negative terminals may be provided in a manner similar to that shown in FIG. 6. Alternatively, both terminals may be provided for the upper vessel element 21. At the time of drawing, the flange section, which constitutes an important feature of the present invention, is formed on the lower vessel element 22, such that they are integral with each other and forms one body.

When the upper and lower vessel elements 21 and 22 are welded together, with the welding ring 23 interposed, the power generating element 13 assembled in the manner shown in FIG. 6 is sealed in the resultant pressure vessel 20.

With this structure, the coil heater 24 is driven by a drive controller (not shown) and generates heat. This heat is transmitted through the flange section 22a to the lower vessel element 22, the welding ring 23 and the upper vessel element 21. The pressure vessel 20 is maintained at a temperature suitable for an electrochemical reaction. Accordingly, the power generating element inside the pressure vessel 20 is allowed to perform efficient charging and discharging operations.

A plurality of pressure vessels 20, each constituting a nickel-hydrogen battery cell, are assembled on a fixing plate (FIG. 2) so as to provide a nickel-hydrogen battery.

As shown in FIG. 2, the fixing plate 30 has a plurality of fixing holes 30a which are formed at predetermined intervals. In each of the fixing holes 30a, the lower vessel element 22 of the pressure vessel 20 is inserted such that the flange section 22a of the lower vessel element 22 engages with the plate portions surrounding the hole 30a. How the pressure vessels 20 are assembled on the fixing plate 30 is shown in FIG. 3. The flange section 22a of the lower vessel element 22 of each pressure vessel 20 is coupled to the plate portions surrounding the corresponding hole 30a by use of an insulative adhesive, and subsequently the flange section 22a is fixed to the fixing plate 30 by means of a screw (not shown). In this manner, the nickel-hydrogen battery is fabricated.

In the nickel-hydrogen battery cell, the flange section 22a is provided for the outer wall 22a of the lower vessel element 22 of the pressure vessel 20. With this structure, the coil heater 24 for temperature control can be provided on the flange section 22a, and the temperature of the pressure vessel 20 can be easily controlled with accuracy by merely controlling the temperature of the flange section 22a by use of the coil heater 24.

In addition, since the temperature of the pressure vessel 20 can be controlled by directly heating the flange section 22a by use of the coil heater 24, the thermal conduction path required from the coil heater 24 is as short as possible, and efficient thermal control is thus ensured. Since the capacity of the heater required is small, the power saving characteristic can be remarkably improved in comparison with that of the prior art.

Since the coil heater 24 can be provided for the flange section 22a when the pressure vessel is fabricated, the required assembling operation is not complex.

Further, the pressure vessels 20 can be easily arranged and assembled by merely coupling the flange section 22a of each pressure vessel 20 to the plate portions surrounding the corresponding fixing hole 30a. Hence, the nickel-hydrogen battery can be fabricated easily.

The above embodiment was described, referring to the case where the flange section 22a is provided for the lower vessel element 22. However, this in no way restricts the present invention. As shown in FIG. 4, a flange section 21a, which is similar to the flange section 22a mentioned above, may be provided for the upper vessel element 21. In this case, the coil heater 24 is attached to this flange section 21a. Similarly, a flange section 23a, which is similar to flange section 22a or 21a, may be provided for the welding ring 23, as shown in FIG. 5. In this case, the coil heater 24 is provided on this flange section 23a. These modifications can enjoy the similar advantages to those mentioned above. In each case, the flange section 22a, 21a or 23a may have cutout sections arranged in a circumferential direction to form a chrysanthemum-shaped structure. Such cutout sections may be provided throughout the circumference of the flange section or in part.

In the above embodiment and modifications, the coil heater 24 is employed for heating the flange section. However, this in no way restricts the present invention. An arbitrary type of heater may be employed for the same purpose.

In addition, the pressure vessel 20 need not be made up of two parts, namely, the upper and lower vessel elements 21 and 22; it may be made up of an arbitrary number of vessel parts.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A nickel-hydrogen battery cell comprising:

a fixing plate having a fixing hole;

a pressure vessel having a flange projected from an outer wall thereof, and also having an intermediate portion which is inserted into the fixing hole of the fixing plate, thereby fixing the flange to the fixing plate; and a power generating element sealed inside the pressure vessel and including a plurality of pairs of electrodes, each of said pairs having a nickel electrode, a hydrogen electrode, and a separator interposed between the nickel and hydrogen electrodes and impregnated with an electrolytic solution, said power generating element generating power by utilization of a chemical reaction between the nickel electrode and the hydrogen electrode.

2. A nickel-hydrogen battery cell according to claim 1, further comprising a temperature-controlling heater attached to the flange section.

3. A nickel-hydrogen battery cell according to claim 2, wherein:

said pressure vessel includes a first vessel element, a second vessel element, and a welding ring, said first and second vessel elements being welded together with the welding ring interposed therebetween, such that a capsule-like structure is formed thereby, wherein at least one of said first vessel element, said second vessel element, and said welding ring includes said flange.

4. A nickel-hydrogen battery cell according to claim 3, wherein said flange section includes cutout sections arranged in a circumferential direction thereof.

5. A nickel-hydrogen battery cell according to claim 2, wherein said heater is a coil heater fixed to the flange section by means of a screw.

6. A nickel-hydrogen battery cell according to claim 5, wherein said flange section includes cutout sections arranged in a circumferential direction thereof.

7. A nickel-hydrogen battery cell according to claim 2, wherein said flange section includes cutout sections arranged in a circumferential direction thereof.

8. A nickel-hydrogen battery cell according to claim 1, wherein:

said pressure vessel includes a first vessel element, a second vessel element, and a welding ring, said first and second vessel elements being welded together with the welding ring interposed therebetween, such that a capsule-like structure is formed thereby, wherein at least one of said first vessel element, said second vessel element, and said welding ring includes said flange.

9. A nickel-hydrogen battery cell according to claim 8, wherein said flange section includes cutout sections arranged in a circumferential direction thereof.

10. A nickel-hydrogen battery cell according to claim 1, wherein said flange section includes cutout sections arranged in a circumferential direction thereof.

11. A nickel-hydrogen battery comprising:

a plurality of nickel-hydrogen battery cells each of which includes: (i) a pressure vessel having an outer wall from which a flange is projected; and (ii) a power generating element sealed inside the pressure vessel and including a plurality of pairs of electrodes, each of said pairs having a nickel electrode, a hydrogen electrode, and a separator interposed between the nickel and hydrogen electrodes and impregnated with an electrolytic solution, each of said power generating elements generating power by utilization of a chemical reaction between the nickel electrode and the hydrogen electrode; and a fixing plate having a plurality of fixing holes, said pressure vessel of each of the nickel-hydrogen battery cells is assembled with reference to the fixing plate such that an intermediate portion of the pressure vessel is fitted in one of the fixing holes of the fixing plate and the flange portion is attached to the fixing plate.

12. A nickel-hydrogen battery according to claim 11, further comprising a heater attached to the flange section, for temperature control.

13. A nickel-hydrogen battery cell according to claim 12, wherein:

said pressure vessel includes a first vessel element, a second vessel element, and a welding ring, said first and second vessel elements being welded together with the welding ring interposed therebetween, such that a capsule-like structure is formed thereby, wherein at least one of said first vessel element, said second vessel element, and said welding ring includes said flange.

14. A nickel-hydrogen battery according to claim 13, wherein said flange section includes cutout sections arranged in a circumferential direction thereof.

15. A nickel-hydrogen battery according to claim 12, wherein said heater is a coil heater fixed to the flange section by means of a screw.

16. A nickel-hydrogen battery cell according to claim 15, wherein said flange section includes cutout sections arranged in a circumferential direction thereof.

17. A nickel-hydrogen battery according to claim 12, wherein said flange section includes cutout sections arranged in a circumferential direction thereof.

18. A nickel-hydrogen battery according to claim 11, wherein:

said pressure vessel includes a first vessel element, a second vessel element, and a welding ring, said first and second vessel elements being welded together with the welding ring interposed therebetween, such that a capsule-like structure is formed thereby, wherein at least one of said first vessel element, said second vessel element, and said welding ring includes said flange.

19. A nickel-hydrogen battery according to claim 18, wherein said flange section includes cutout sections arranged in a circumferential direction thereof.

20. A nickel-hydrogen battery according to claim 11, wherein said flange section includes cutout sections arranged in a circumferential direction thereof.

* * * * *

UNITED STATES PATENT AND TRADEMARK OFFICE
CERTIFICATE OF CORRECTION

PATENT NO. : 5,876,871
DATED : March 2, 1999
INVENTOR(S) : Yoshihiro TAKIZAWA

It is certified that error appears in the above-identified patent and that said Letters Patent is hereby corrected as shown below:

On the title page, item [30], the Foreign Application Priority Data should read:

--Sep. 13, 1995 [JP] Japan ...................................................7-235356--

Signed and Sealed this

Sixth Day of July, 1999

Q. TODD DICKINSON

*Attest:*

*Attesting Officer*    Acting Commissioner of Patents and Trademarks